United States Patent [19]

Nuttle

[11] Patent Number: 4,608,175

[45] Date of Patent: Aug. 26, 1986

[54] INTEGRAL WASTE DISPOSAL SYSTEM

[76] Inventor: David A. Nuttle, Rte. 2, 137 White Oak Dr., Youngsville, N.C. 27596

[21] Appl. No.: 628,481

[22] Filed: Jul. 6, 1984

[51] Int. Cl.$^4$ .............................. C02F 3/12; C02F 9/00
[52] U.S. Cl. .................... 210/532.2; 203/DIG. 5; 4/209 R; 4/209 FF; 422/290
[58] Field of Search .................... 210/532.2, 170; 203/DIG. 1, DIG. 5; 159/1 S, 1 RW; 4/111.1, 111.6, 317, 318, 321, 322, 460, 474, 475, 476, 477, 209 R, 209 FF, DIG. 12; 422/189, 285, 288, 290

[56] References Cited

U.S. PATENT DOCUMENTS

| | | | |
|---|---|---|---|
| 2,432,887 | 12/1947 | Haviland | 203/DIG. 5 |
| 3,136,608 | 6/1964 | Lindström | 422/239 |
| 3,474,468 | 10/1969 | Blankenship | 203/DIG. 5 |
| 3,868,731 | 3/1975 | Stahl et al. | 203/DIG. 5 |
| 3,925,206 | 12/1975 | Dea | 210/170 |
| 4,044,696 | 8/1977 | Marincek | 203/DIG. 5 |
| 4,055,473 | 10/1977 | Hay | 203/DIG. 1 |
| 4,084,269 | 4/1978 | Lindström | 422/288 |
| 4,213,864 | 7/1980 | Asikainen | 210/170 |

Primary Examiner—Richard V. Fisher
Assistant Examiner—Wanda L. Millard
Attorney, Agent, or Firm—Mills & Coats

[57] ABSTRACT

This invention is a sanitary disposal system for human waste and organic garbage by aerobic composting combined with solar evaporative distillation for greywater. The aerobic composting reduces waste volume by ninety percent leaving water, carbon dioxide and a harmless but fertile ash by-product. Except for urine, the system essentially operates dry. No chemicals, septic system, or sewage treatment plant is required. There is no odor and no polluting discharged during operation. A nonsoiling toilet seat is provided so a dry toilet bowl may be used without the usual problems of cleaning. Insects are prevented from entering or leaving the system which is constantly aerated to assure that the composting process does not convert to anaerobic. The greywater system further enhances pollution control. This includes solar evaporative distillation to separate out solids which can be disposed of in a sanitary dump while the reclaimed water can be used for nonhousehold purposes.

17 Claims, 14 Drawing Figures

INTEGRAL WASTE DISPOSAL SYSTEM

FIELD OF INVENTION

This invention relates to human waste disposal and more particularly to composting toilets for the disposal of human feces, urine, and garbage with an integral solar evaporative distillation means for disposal of greywater.

BACKGROUND OF INVENTION

Human wastes are typically disposed of by a waterborne waste transport system whereby feces, urine, garbage, and greywater are either flushed to sewage treatment plants or percolated into the ground via a septic field. A family of five will generally flush 80 gallons of water per day down the toilet. This same family uses a mean of another 150 gallons per day for washing dishes, clothes, hair, teeth and skin. All of this water (over 2.5 trillion gallons a year in the U.S.) must be acquired, stored, transported and purified before it is used. Water is becoming increasingly expensive, and it is very difficult to provide in those areas where water shortages exist.

Sewer systems are not always available, and when they are available they are often defective. Many solids do not percolate well and, therefore, preclude the use of septic fields or make them ineffective if used. Thus, pollution of the environment often results from these problems with the present waterborne waste transport system. The greatest impact of such pollution is the contamination of soils, surface water, and ground water by nitrogen, phosphorus, trace elements, chemicals, salts, grease, suspended solids, bacteria and pathogens.

In 1964 an alternative means of human waste disposal was invented as shown in U.S. Pat. No 3,136,608. This invention, known as a Clivus Multrum or Swedish composting toilet, utilizes biological decomposition to decompose human and organic wastes. By using a sloping tank inclined at 20 to 30 degrees with air channels and compartments to assist natural aeration and mixing, an odorless form of aerobic composting takes place. Waste volume is reduced over 90 percent while harmless by-products such as water vapor and carbon dioxide are vented to the outside air. A small quantity of compost ash is removed from the Clivus and an annual basis. This ash is safe for use as a fertilizer for lawns and animal crops. Clivus toilets are used throughout Europe and in almost every state in the United States.

The Clivus Multrum toilet has not become popular in the United States because most people associate it with an odor producing anaerobic pit privy. Although the Clivus can dispose of kitchen garbage, it cannot dispose of greywater. In many situations, such a partial solution to the waste disposal problem is no solution at all. Several alternative greywater disposal systems have been proposed, but all have problems that preclude effective operation. Since the Clivus does not operate well with the addition of water, flushing water cannot be used to clean the toilet bowl or closet chair. The Clivus has, therefore, had a hygienic reason for lacking popular acceptance.

The inventor of the Clivus attempted to solve the flushing problem in 1978 as shown in U.S. Pat. No 4,084,269 by developing a flushing system that would not deter the composting process. This invention failed because any flushing made the composting process far less efficient. Clivus systems have also had problems in that they did not prevent the entry of insects, and because the aeration system was often inadequate. Also intake air was not sufficiently warmed in cold weather. Cold-shock and death or damage to aerobic bacteria resulted from this failure. The above set forth deficiencies all combined to have a negative impact upon the Clivus. In summary, it is an alternative solution that has failed to meeting existing needs for new approaches to human waste disposal.

BRIEF DESCRIPTION OF INVENTION

After much research and study into the above-mentioned problems, the present invention has been developed to provide a safe and sanitary means to dispose of human waste. This means is partly accomplished by disposing of human feces, urine and kitchen garbage in a Clivus-type tank made more efficiency by providing a push-pull ventilation system that uses two small energy-efficient fans. Also a primary and secondary method to assure that intake air is sufficiently warmed to avoid cold-shock of aerobic bacteria is provided. Additionally a simple method for the periodic introduction of a measured quantity of bulking agent such as sawdust to improve the composting process is used.

The present invention also provides a screen at each vent to keep out insects, has a unique toilet bowl or closet chair that is designed to prevent feces or urine from contacting said bowl, has pond liner such as Hypalon 45 inside the concrete tank to assure that leakage from the tank does not occur in the event the concrete cracks, has child-proof safety latch on the toilet bowl lid to prevent small children from entering the bowl or tank, and has disposable diaper technique that allows paper diapers and waste to be composted after removal of an outer protective plastic layer that can be disposed of as trash.

The remainder of the disposal system is designed to recycle greywater so that the grey solids are separated from the water. This separation is accomplished by draining the greywater into two small recovery ponds having pond liners and a sealed glazed canopy overhead. The canopy is shaped so as to collect the distilled water droplets that form under the surface of the canopy. These droplets then fall into a series of collection troughs that move the water to a storage tank or other suitable means. The water thus collected may be used to water lawns, trees, and crops whose edible parts do not come into direct contact with the distilled recovered greywater.

After the removal of water from the above ponds, everything remaining is collected by using solar energy to totally dry one pond (as needed) while the other pond continues operating. This grey material should be disposed of by a septic tank cleaning company on an annual basis if not more often. Efficiency of the above greywater system is highest when grease is isolated from the greywater via grease traps or other means. It also improves efficiency if biodegradable soaps are used in the home. When greywater contains a high percentage of suspended solids, the same should be percolated through 30 inches of sand at the rate of 6 gallons per cu. ft. per day. This technique will also preclude most harmful bacteria from entering the ponds. Greywater ponds should be aerated as needed to prevent pond conversion from an aerobic to an anaerobic status. With careful quantity control over the distilled water produced from the greywater, it is possible to use this recycled water for as many uses as may be approved by local health departments.

In view of the above, it is an object of the present invention to provide an integral waste disposal system reducing normal water consumption for any given household by at least thirty-five percent.

Another object of the present invention is to provide an aerobic composting means in combination with an integral waste disposal system.

Another object of the present invention is to provide a greywater solar distillation means in combination with an integral waste disposal system.

Another object of the present invention is to provide an improved dry type toilet for use in conjunction with an aerobic decomposing means.

Another object of the present invention is to provide an inlet air heating means for use in conjunction with an aerobic decomposing system.

Another object of the present invention is to provide a basically dry decomposing system for both human feces and biodegradable garbage in combination with a greywater waste recovery means.

Other objects and advantages of the present invention will become apparent from a study of the following description and the accompanying drawings which are merely illustrative of such invention.

DETAILED DESCRIPTION OF INVENTION

With further reference to the drawings, the integral waste disposal system of the present invention, indicated generally at 101, is composed of a decomposing tank portion, indicated generally at 10, a toilet chair portion, indicated generally at 11, and a greywater distillation portion, indicated generally at 12.

The tank portion 10 of the present invention is generally rectangular in cross section, is constructed from a ridged material such as reinforced concrete, has a clean-out wall 13 with a clean-out opening 13' therein, an impervious bottom 14, an impervious end wall 15, two impervious side walls 16, and a top 17 having a plurality of openings therein which will hereinafter be described in greater detail.

Extending from bottom 14 adjacent clean-out wall 13 to a point two-thirds of the way up end wall 15 is an inclined floor 18. Below this inclined floor is a support material such as aggregate 19. Between inclined floor 18 and aggregate 19 is a waterproof liner formed from a plastic-type water impervious material such as Hyplon 45. Since water impervious liners of this general type are well known to those skilled in the art and are commercially available, further detailed description of the same is not deemed necessary.

Figure 2:
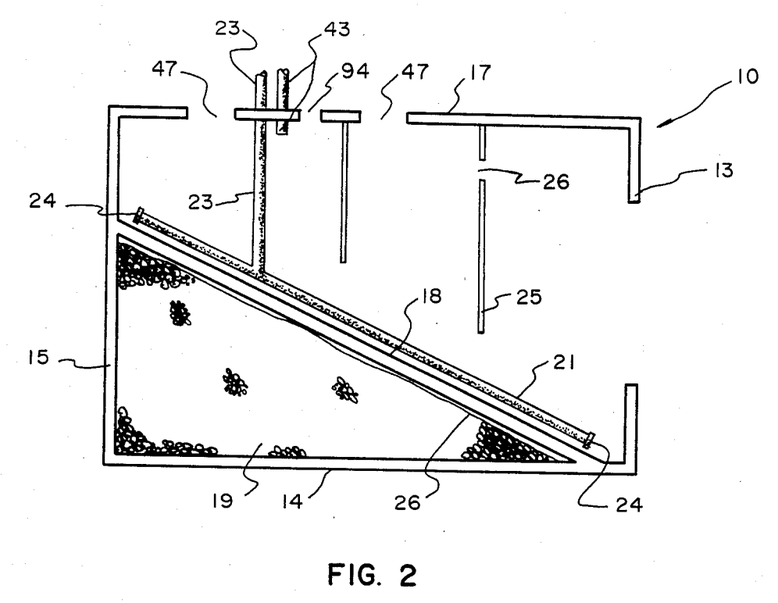
FIG. 2 is a sectional view showing the tank portion of the present invention.
Figure 3:
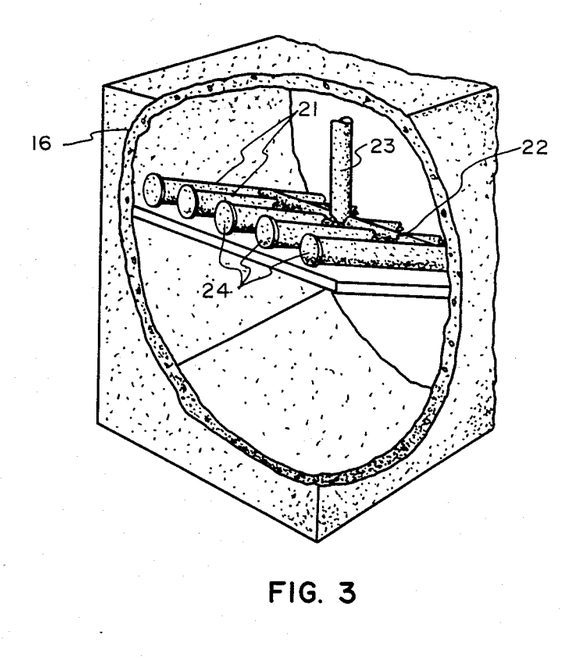
FIG. 3 is a cutaway perspective view of said tank.

A plurality of perforated aeration pipes 21 are provided which are disposed parallel to and slightly above inclined floor 18 as can clearly be seen in FIGS. 2 and 3. These pipes are communicatingly interconnected by manifold 22 which communicates with air inlet pipe 23.

Both ends of each of the perforated aeration pipes 21 are capped as indicated at 24.

Extending across the interior of tank portion 10 between side walls 16 and depending from the underside of top 17 are a plurality of control baffles 25, at least one of which includes a vent opening as indicated at 26 in FIG. 2. The purpose of these baffles will hereinafter be discussed in greater detail.

Extending above the roof 27 of building structure 28 is exterior inlet pipe 29. Freely rotatively mounted on the end of pipe 29, through means such as collar 30, is a curved inlet elbow 31 having a wind vane 32 fixedly secured thereto. From the above it can be seen that the inlet opening 33 of elbow 30 will always be disposed away from the prevailing wind thus preventing ambient air movement from building up undesirable internal pressure within tank 10.

Over inlet opening 33 of elbow 30 is a microscreen of the size commonly known as No-See-Um which prevents even extremely small insects from passing therethrough. Since screening of this type is well known to those skilled in the art, further detailed discussion of the same is not deemed necessary.

Figure 10:
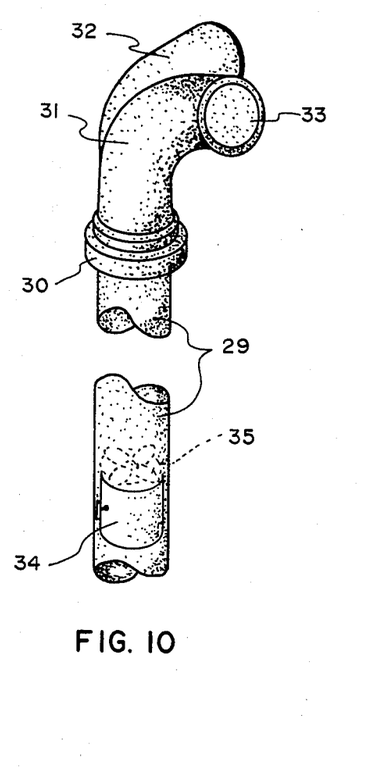
FIG. 10 is a partially cutaway perspective view of the air intake pipe.

In the side of air inlet pipe 29 is an access door 34. Operatively mounted interiorly of pipe 29 adjacent door 34 is a small, energy-efficient fan or blower 35. Since fans or blowers of this type are well known to those skilled in the art, further detailed discussion of the same is not deemed necessary.

Figure 12:
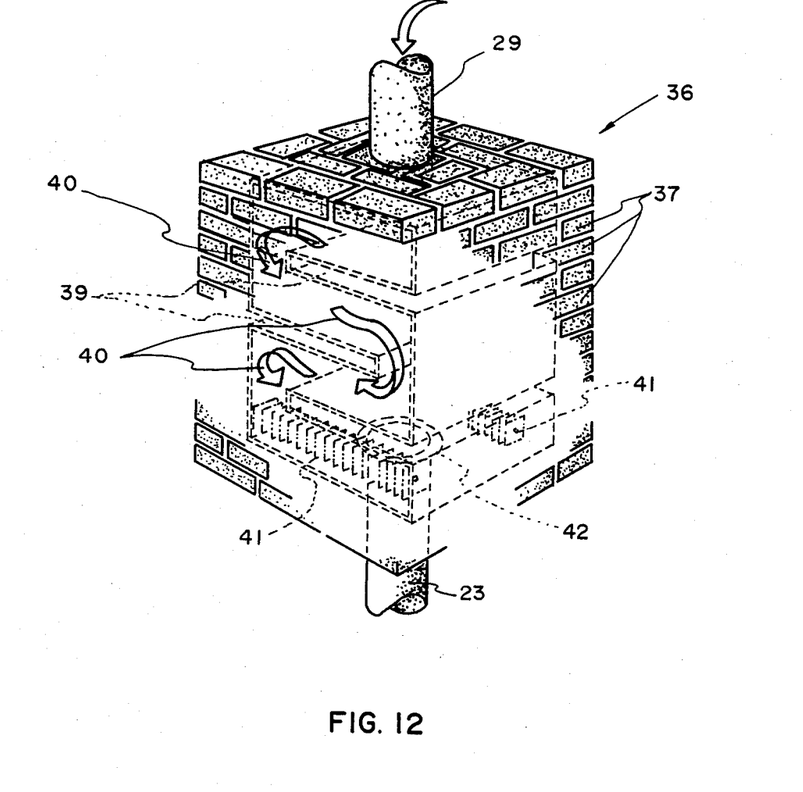
FIG. 12 is a perspective view of the primary and secondary air warming system for the air intake pipe.

The end of air inlet pipe 29 opposite collar 30 communicates with the interior of a solar air warmer, indicated generally at 36. This air warmer is constructed from solar energy absorbing and storing material such as bricks 37.

A skylight 38 is provided in roof 27 on a southern exposure from solar air warmer 36 to allow solar rays to fall on said warmer. A plurality of interior baffles 39 are provided to cause the air passing through warmer 36 to travel a greater distance thereby having more time to become heated.

In the lower portion of warmer 36 is provided a plurality of electric resistance heaters 41 which are thermostatically controlled from a sensor located at warmer outlet 42. During cold weather, on cloudy days, and at night when the internal temperature of the air warmer 36 drops below a predetermined temperature, heaters 41 will automatically activate to assure that the inlet air reaching the interior of tank 10 is sufficiently warm to prevent cold shock, death and/or damage to the aerobic bacteria therein.

Air inlet pipe 23 extends from the interior of tank 10 to the outlet 42 of warmer 36.

From the above it can be seen that the pressure of air entering decomposing tank 10 through inlet pipe 23 can be maintained by blower 35 while the temperature of such air is controlled within preset limits by warmer 36.

Figure 11:
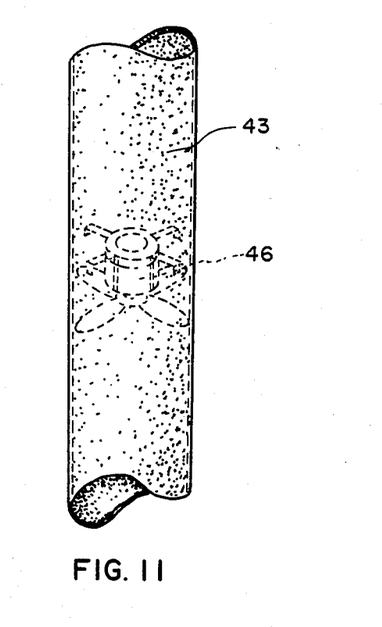
FIG. 11 is a perspective view of a typical section of air exhaust pipe.

Exhaust vent pipe 43 is mounted through top 17 of tank 10 and extends through roof 27 of structure 28 and terminates in a readily rotatable outlet elbow 44 having a wind vane 45 fixedly secured thereto in the same manner that wind vane 32 is secured to and operates rotatable inlet elbow 31.

Also provided within vent pipe 43 is a positive air mover such as fan or blower 46. If desired an access door similar to door 34 can be provided in pipe 43 to service said air mover. Fan or blower 46 is, of course, of the energy efficient type and removes carbon dioxide, moisture, and other gases which are the by-products of the aerobic decomposition process.

One or more toilet inlet openings 47 are provided in top 17 of tank 10. An elongated toilet collar 48 covers opening 47 and extends upwardly to a point adjacent the floor 49 above said tank.

The lower edge of toilet chair 11 includes a downwardly projecting flange 50 which passes through an opening in floor 49 sized for the same. This flange is adapted to snug fit inside the upper edge of toilet collar 48 as can clearly be seen in FIG. 4. An outwardly extending floor flange 51 engages the upper surface of floor 49, again as can clearly be seen in Figure 5.

Figure 4:
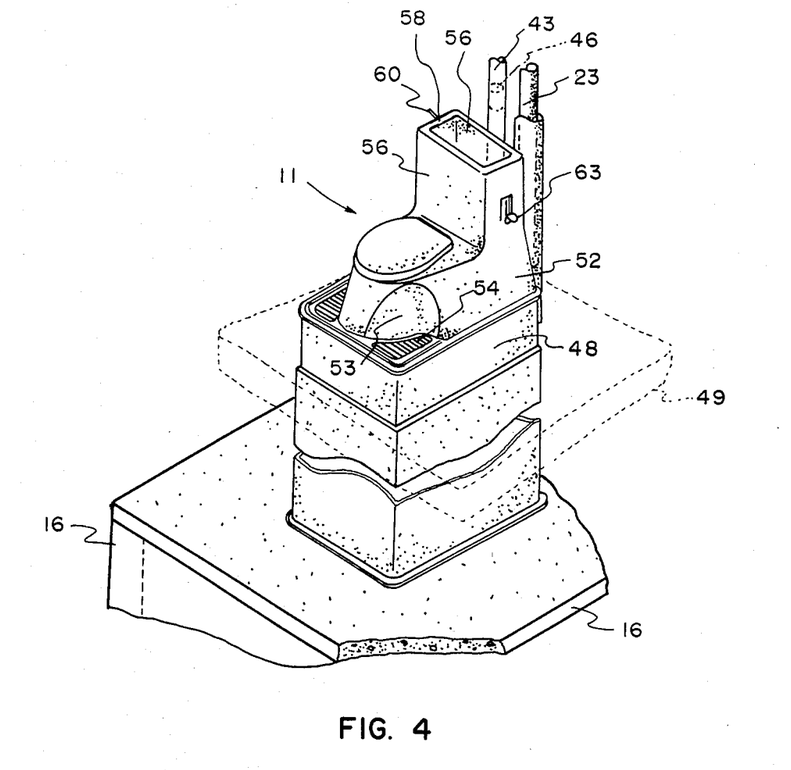
FIG. 4 is a perspective view of the closet chair portion of the present invention.

An open, toilet cavity enclosure 52 is preferably formed from a material such as molded plastic and includes a pair of foot indentions 43 on each side thereof adjacent foot pads 54.

A bulking tank 55 is formed at the rear of and extends upwardly from the toilet cavity enclosure 52. A lid 56 rests on lip 57 and can be removed by lifting with finger hole 58. An agitator bar 59 extends across and is rotatively mounted within tank 55 as can clearly be seen in FIG. 6. This agitator bar has a crank handle 60 fixedly secured thereto which is disposed exteriorly of said bulking tank so that when said crank is turned, the bar will rotate interiorly of the tank to agitate the bulking agent 61 contained therein.

Figure 5:
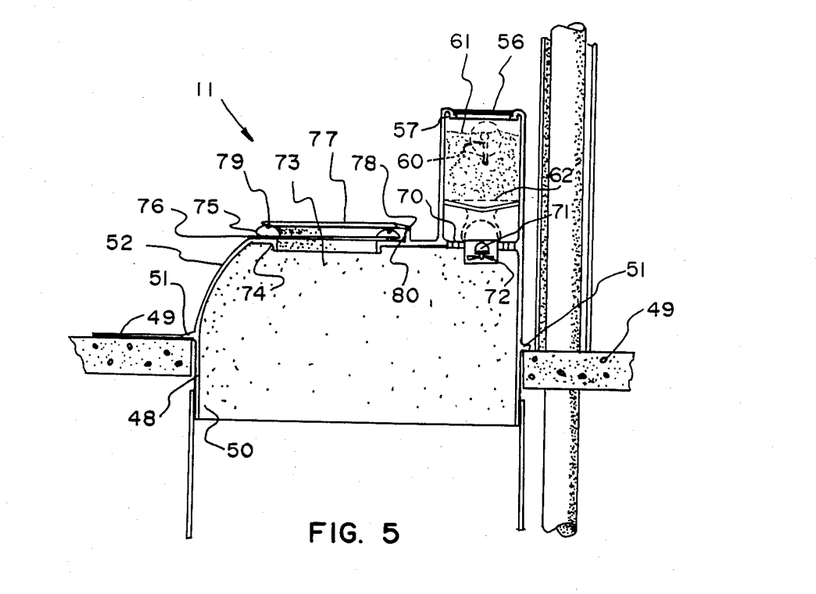
FIG. 5 is a sectional view taken through lines 5—5 of FIG. 4.
Figure 6:
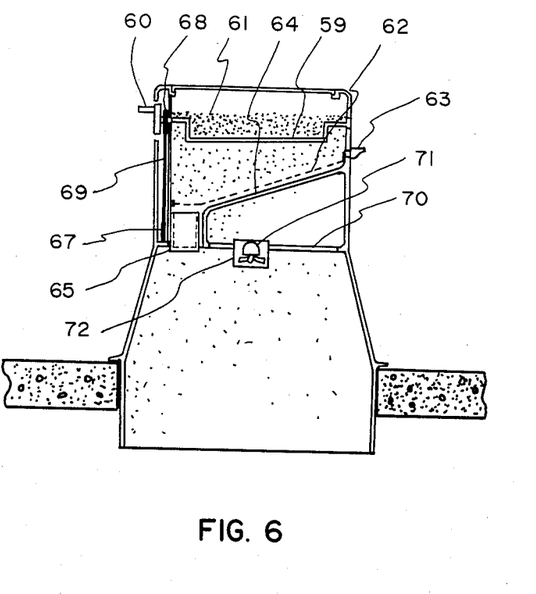
FIG. 6 is a sectional view taken through lines 6—6 of FIG. 4.

A shaker screen 62 is mounted interiorly of tank 55 as shown in FIGS. 5 and 6. At one end of said shaker screen is fixedly secured a shaker handle which extends outwardly from the side of the tank on the side opposite crank 60 as can clearly be seen in FIG. 4. When the bulking material 61 has been stirred and de-lumped by agitator bar 59, shaker handle 53 can be moved up and down to cause such bulking material to sift through shaker screen 62 and pass down the sloping bottom 64 of tank 55 to a point above bulking material release sleeve 65.

Figure 7:
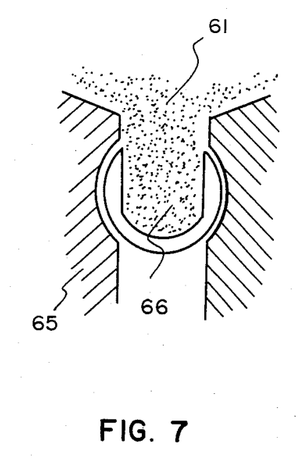
FIG. 7 is a sectional view of the bulking agent release mechanism in loaded position.
Figure 8:
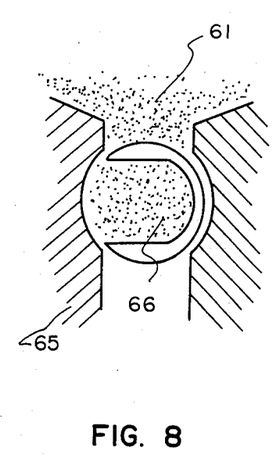
FIG. 8 is a sectional view of the bulking agent release mechanism in partially rotated position.
Figure 9:
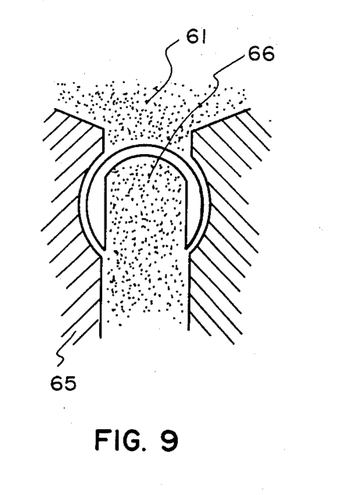
FIG. 9 is a sectional view of the bulking agent release mechanism in dumping position.

Rotatively mounted across sleeve 65 is a bulking material measuring trough 66. A pulley fixedly secured to this measuring trough is mounted exteriorly of said sleeve. A second pulley 68 is fixedly secured to crank 60. A drive belt 69 is trained over pulleys 67 and 68. Thus when crank 60 is turned, through drive belt 69 measuring trough 66 will turn within release sleeve 65 measuring a predetermined amount of bulking material 61 and releasing the same from through the sleeve as illustrated in sequential FIGS. 7, 8 and 9.

A perforated partition 70 extends across bulking tank portion 55 below sloping bottom 64 as shown in FIGS. 5 and 6. A downwardly blowing fan 71 is mounted within shroud 72 which in turn is secured to partition 70.

A toilet opening 73 is provided in the upper portion of toilet cavity enclosure 52 and is surrounded by a reinforcing lip 74. A toilet seat 75 is mounted adjacent toilet opening 73 and includes a rubber gasket 76 forming an air tight seal between the upper portion of toilet cavity enclosure 52 and said toilet seat. A toilet lid 77 is hingedly mounted to the upper portion of toilet cavity enclosure 52 as indicated at 78. Again a rubber, Neoprene or similar gasket 79 is provided between seat 75 and lid 77 to form an air tight seal when said lid is closed.

An on-off switch, indicated at 80, is operatively associated with lid 77 so that when said lid is open, fan 71 will run and when said lid is closed, said fan will be turned off. Since contact switches and fans of this general type are well known to those skilled in the art, further detailed discussion of the same is not deemed necessary.

The greywater distillation portion 12 of the present invention includes two generally rectangular ponds 81 and 82 formed from a liquid impervious material. A plurality of upright members or stanchions 83 are provided around the edges of ponds 81 and 82. Arched cross members 84 are mounted on the upper ends of the stanchions 83 and extend across the ponds 81 and 82 as can clearly be seen in FIG. 13.

Suspended from cross members 84 by means such as cables 85' are weight bars 85 which generally run the length of each of the ponds 81 and 82. Condensing surfaces 86 are suspended between the various stanchions 83 and extend across each of the greywater ponds as clearly shown in FIGS. 13 and 14. These surfaces are preferably formed from a material such as 6 ml polyethylene. With the weight bars 85 lying in tension contact with condensing surfaces 86, a trough-like configuration is formed.

Figure 13:
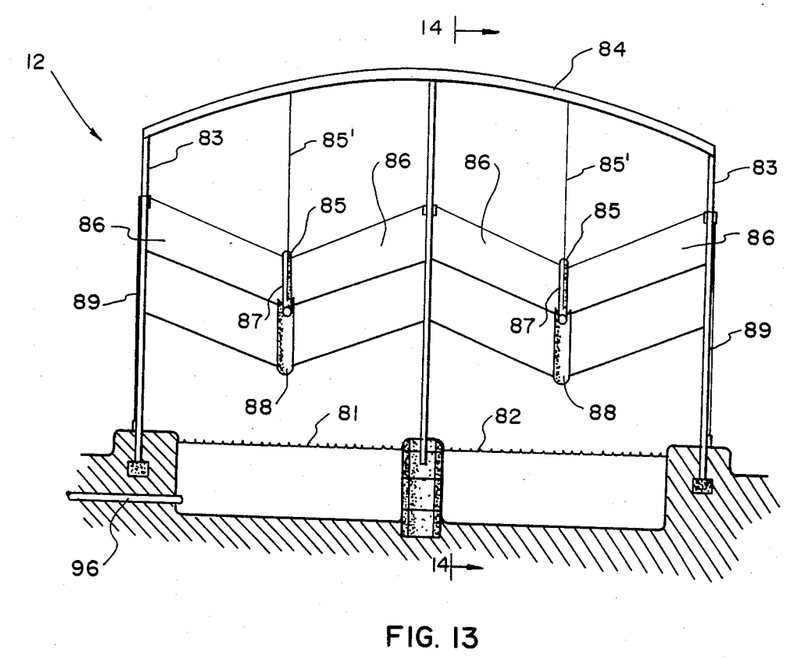
FIG. 13 is a lateral sectional view through the greywater ponds.
Figure 14:
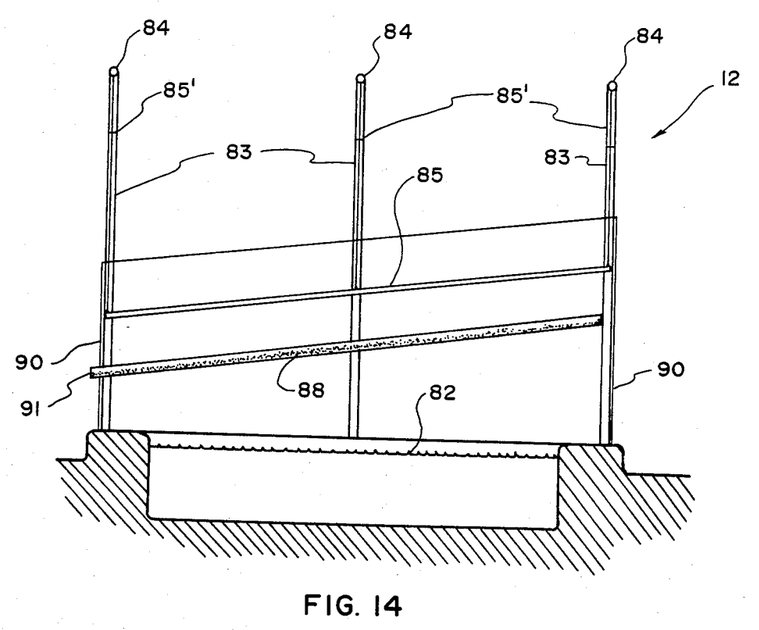
FIG. 14 is a sectional view taken through lines 12—12 of FIG. 13.

Side walls 89 and end walls 90 extend upwardly at least as far as their juncture with adjacent condensing surfaces 86. These sides and ends are formed from a suitable material such as 6 ml polyethylene.

Mounted immediately below the downwardly pointing apex 87 of condensing surfaces 86 is a water collection trough 88. This collection trough extends outwardly through one end wall 90 as shown in FIG. 14.

From the above it can be seen that solar evaporation will readily occur in each of the greywater ponds 81 and 82. This evaporated water will condense on the underside of condensing surfaces 86 and by gravity and surface tension will run down to apex 87 where the water will drop into collection trough 88. Since this trough is inclined, the water then moves to the end 91 of such trough where it can be collected in storage containers, can be piped to irrigation systems, or other uses can be made of the same where potable water is not required.

Figure 1:
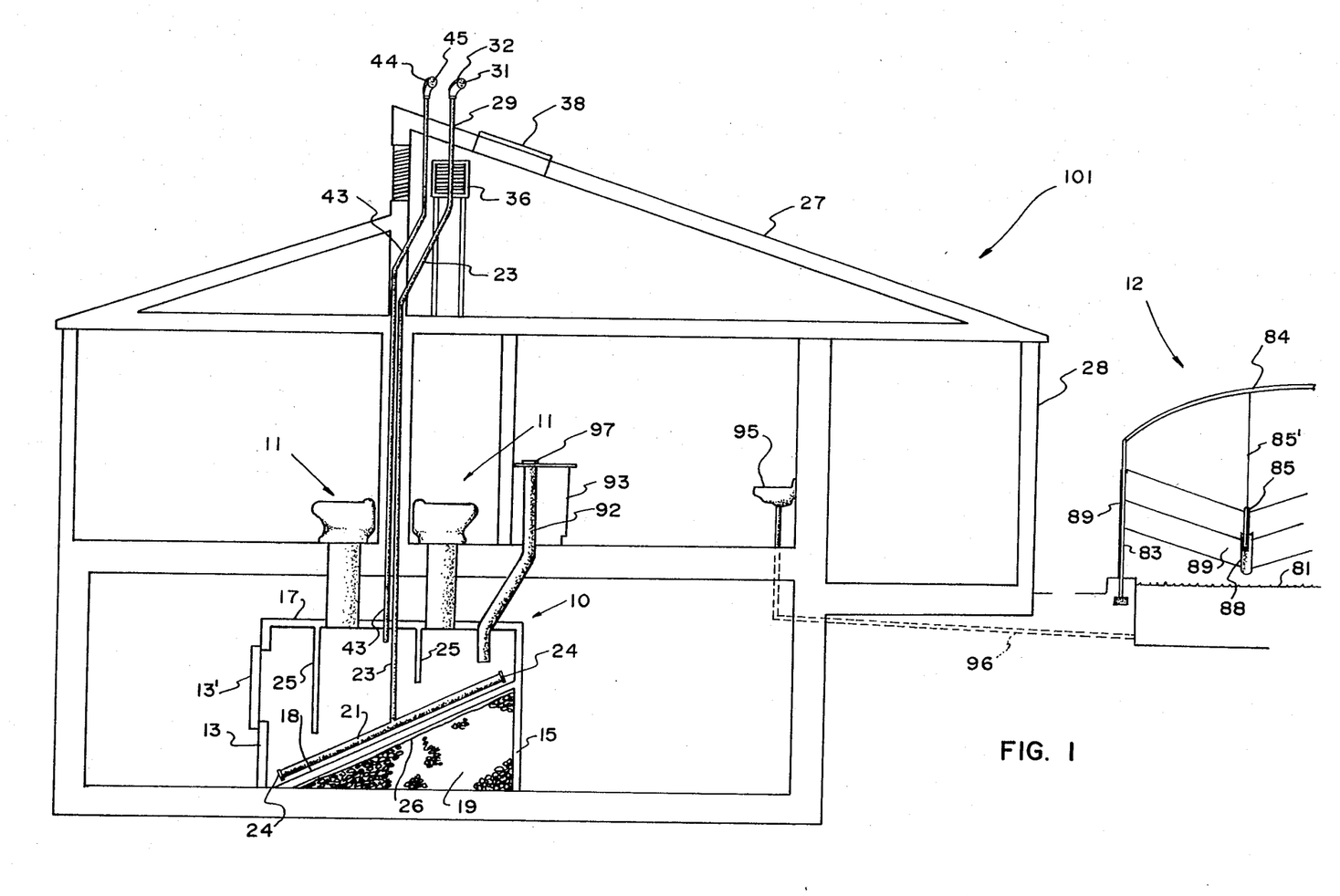
FIG. 1 is a somewhat schematic sectional view of the integral waste disposal system of the present invention.

A garbage chute 92 extends from the top of a kitchen cabinet 93 or other suitable location to a point where it passes through garbage inlet opening 94 in top 17 of decomposing tank 10. Thus it can be seen that biodegradable garbage can be deposited in chute 92 and will pass into tank 10 for decomposition.

The water from normal fixtures 95 such as lavatories, showers, washing machines and the like, drain through waste water line 96 into one of the two greywater ponds. From there, as discussed above, the water will be evaporated out leaving only solids to be later disposed of.

Once the integral waste disposal system of the present invention has been installed as set forth above, the toilets 11 can be used in the normal manner as can the garbage chute 92. Since air is constantly circulated through tank 10, aerobic decomposition is rapidly accomplished and once the piled up feces and garbage decomposes, the remaining ash can move past baffles 25 to the lower end of inclined floor 18. Periodically, and at least on a yearly basis, this ash of decomposition can be cleaned out by removing closure 13' from the opening in wall 13 as shown in FIG. 1.

No odor is encountered during use of the present invention and no undesirable gases escape due to the automatic operation of toilet fan 71 which blows downwardly through toilet cavity enclosure 52. A removable cover or cap 97 over garbage chute 96 likewise assures that pressure can be maintained within tank 10 and that all gases will be expelled out of outlet elbow 44 by exhaust fan 46 through pipe 43.

As the various water consuming fixtures 95 are used, the waste water moves through line 96 into one of the pre-selected greywater ponds 81 or 82. From there the sun shining through the sides 89, the ends 90, and the condensing surfaces 86 will cause the water in said greywater pond to evaporate and be recondensed on condensing surfaces 86. By gravity, due to the slope of such surfaces, the droplets will run down to apex 87 and drop into collection trough 88. From there the water will run to the end 91 of such trough where it can be used for any purpose where nonpotable water is acceptable.

Once one of the ponds becomes full, the other one can be used. Once all water has been evaporated out of the full pond and the solid residue dried, it can be simply scooped up and taken to any convenient designated sanitary disposal area.

Optimum sizes of the Clivus-type tank and the greywater recovery ponds are determined by use rates. Water conservation devices are suggested and can be used to reduce the volume of water flowing to the ponds. The flow-rate will already be reduced 35 percent due to use of the composting toilet. Under these circumstances, two each 8 feet × 12 feet recovery ponds will recycle greywater at a rate of 1 gal. per surface sq. ft. per day to meet the needs of a typical family of five. A Clivus-type tank measuring 4 feet × 12 feet × 8 feet deep at the bottom end will be more than adequate to dispose of the human waste including feces and urine from two toilets plus garbage for the same family and visitor use. This tank capacity includes toilet paper and bulking agent material such as sawdust.

To help overcome any homeowner or local health department objection to this invention, users can contract with a local septic tank cleaning company to remove composting ash from the above said tank on an annual basis. This company can also be used to dispose of the grey from the greywater system.

From the above it can be seen that the present invention greatly reduces the amount of water used by any given household or other similar structure. Additionally, the majority of what little water is used is recycled for nonpotable purposes thus providing an extremely energy efficient integral waste disposal system.

The present invention can, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A system for disposal of household liquid and solid waste comprising: an aerobic biological decomposing tank for receiving and treating human and organic waste, said decomposing tank having waste inlet means for depositing said human and organic waste, aeration means including air inlet means, air exhaust means and blower means for causing a positive air flow through said decomposing tank, and access means for removal of ash resulting from the decomposition of said human and organic waste; and a solar evaporative distillation and collecting system for receiving and distilling waste water, said distillation system being independent of said decomposing tank and having at least one reservoir for receiving said waste water, a trough-like condensing surface having an extending lower apex over a substantial portion of said reservoir, and a water collection trough disposed below said apex of said condensing surface whereby a highly efficient, low cost system for disposal of household solid and liquid waste is provided.

2. The disposal system of claim 1 wherein said air inlet means includes means for heating air as such air passes through said air inlet means.

3. The disposal system of claim 2 wherein said means for heating air is a solar air warmer.

4. The disposal system of claim 3 wherein said solar air warmer includes a secondary heating means for heating air when the internal temperature of said solar air warmer drops below a predetermined temperature.

5. The disposal system of claim 4 wherein said secondary heating means is an electrical resistance heater.

6. The decomposing system of claim 1 wherein the means for depositing the solid human waste in the aerobic biological decomposing system is a toilet chair type means.

7. The decomposing system of claim 6 wherein said toilet chair means includes an associated bulking material depositing means.

8. The decomposing system of claim 7 wherein the bulking material is of the sawdust type.

9. The disposal system of claim 8 wherein said toilet chair means includes a driven air flow means to reduce the likelihood of odor escaping therefrom.

10. The disposal system of claim 7 including a means for premeasuring the amount of bulking material used.

11. The disposal system of claim 1 wherein said aeration means further includes means for preventing build-up of internal pressure within said decomposing tank whereby more efficient decomposing is achieved.

12. The disposal system of claim 11 wherein said means for preventing pressure build-up includes self-adjusting inlet and exhaust openings which change direction with the wind so as to always be disposed away from the prevailing winds.

13. The disposal system of claim 1 wherein said distillation and collection system includes two reservoirs for alternately receiving waste water while the other reservoir is being serviced 14. The waste disposal system of claim 13 wherein a separate condensing surface and collecting trough is provided for each reservoir.

15. The decomposing system of claim 1 wherein the means for depositing the organic waste in the aerobic biological decomposing system is a garbage chute type means.

16. The decomposing system of claim 11 wherein the means for disposing the liquid waste in the evaporative distillation system is a plumbing fixture type means.

17. The disposal system of claim 1 wherein said blower means includes a first fan-type means disposed within said air inlet means for pushing air into said decomposing tank and a second fan-type means disposed within said air exhaust means for pulling air from said decomposing tank, whereby a push-pull ventilation system is provided.

* * * * *